United States Patent [19]

Bones et al.

[11] Patent Number: 5,057,384
[45] Date of Patent: Oct. 15, 1991

[54] ELECTRODE HOLDER

[75] Inventors: Roger J. Bones, Abingdon; James H. Duncan, Stafford, both of England; Jacobus H. De Jager, Verwoerdburg, South Africa

[73] Assignee: Lilliwyte Societe Anonyme, Luxembourg

[21] Appl. No.: 618,313

[22] Filed: Nov. 26, 1990

[30] Foreign Application Priority Data

Dec. 1, 1989 [GB] United Kingdom ................. 8927274

[51] Int. Cl.$^5$ ............................................. H01M 10/39
[52] U.S. Cl. ...................................... 429/104; 429/193
[58] Field of Search ........................... 429/31, 104, 193

[56] References Cited

U.S. PATENT DOCUMENTS

4,279,974  7/1981  Nishio .................................. 429/104
4,405,696  9/1983  Fischer et al. ....................... 429/104

Primary Examiner—Donald L. Walton
Attorney, Agent, or Firm—Arnold, White & Durkee

[57] ABSTRACT

The invention provides a compressed envelope of solid electrolyte for holding an electrode in an electrochemical cell. The envelope comprises corrugated sheets joined along their edges. The sheets are aligned with each other so that their corrugations extend parallel along the length of the envelope and a space is defined between the sheets. The corrugations of the sheets nest in each other where the sheets are joined together at the ends of the envelope. The invention also provides a method of making the envelope and a cell having an electrode held in said envelope.

17 Claims, 8 Drawing Sheets

ELECTRODE HOLDER

This invention relates to a laterally compressed envelope of solid electrolyte material for use as an electrode holder in an electrochemical cell; to a method of making such envelope and such envelope when made in accordance with the method; and to an electrochemical cell comprising an electrode in said envelope.

According to one aspect of the invention there is provided a laterally compressed envelope of solid electrolyte material for use as an electrode holder in an electrochemical cell, the envelope having a pair of opposed corrugated major faces provided by a pair of sheets of the solid electrolyte material joined to each other along their edges to provide a peripheral edge for the envelope, the major faces being aligned with each other so that their corrugations extend lengthwise along the envelope parallel to one another and so that at least one space is defined between the faces for holding electrode material, the corrugations in each major face nesting face-to-face in the corrugations of the other major face at the ends of the envelope where the sheets are joined to each other.

The major faces may be aligned so that the corrugations of each major face are, over at least a portion of the length of the envelope, at least partially out of phase with, ie at least partially staggered relative to, the corrugations of the other major face in a direction normal to the length of the corrugations.

The corrugations of each major face may, over a major portion of the length of the envelope, be 180° out of phase with the corrugations of the other major face, so that the sheets define therebetween, over said major portion of the length of the envelope, a plurality of tubular spaces extending in parallel side-by-side relationship.

Instead, the corrugations of each major face may, over a minor portion of the length of the envelope, be 180° out of phase with the corrugations of the other major face to define between the sheets a plurality of tubular spaces in side-by-side parallel relationship, the tubular spaces being located at or adjacent one end of the envelope and the corrugations of each major face, between said tubular spaces and the join between the sheets at the opposite end of envelope, being in phase with and nesting in the corrugations of the other major face over a major portion of the length of the envelope, the sheets being spaced apart from each other along said major portion of the length of the envelope.

Instead, the corrugations of each major face may, over their full lengths between the joins between the sheets at the ends of the envelope, be in phase with and nesting in the corrugations of the other major face, the sheets being spaced apart from each other along said nesting parts of the corrugations.

The envelope may have an opening into its interior to permit flow of material therethrough during use of the envelope as an electrode holder.

Spacing means may be located between the sheets in the interior of the envelope to space the sheets apart and to promote communication and liquid flow between all parts of the interior of the envelope. The spacing means may be in the form of a corrugated porous spacer sheet located between the major faces of the envelope, the spacer sheet having corrugations which are smaller in pitch and amplitude than the corrugations of the major faces.

The envelope is conveniently formed entirely of sintered alumina, at least the sheets providing the major faces of the envelope being of $\beta$-alumina.

According to another aspect of the invention there is provided a method of making a laterally compressed envelope of solid electrolyte material for use as an electrode holder in an electrochemical cell, the method comprising the steps of:

forming a mixture comprising said solid electrolyte material or a precusor thereof in particulate form together with a binder formulation which has both thermoplastic and setting properties;

forming the mixture into corrugated sheet material;

forming two corrugated sheets of the sheet material into a laterally compressed envelope having a pair of opposed corrugated major faces formed from said sheet material, the sheets being joined to each other along a peripheral edge of the envelope and being arranged so that at least one space is defined between the sheets for holding electrode material;

treating the envelope to cure the binder formulation;

heating the envelope after the curing to volatilize the binder formulation; and sintering the envelope after the volatilization to convert the envelope into a sintered refractory solid electrolyte artifact, the major faces of the envelope being aligned with each other during the forming of the envelope from the corrugated sheets so that their corrugations extend lengthwise along the envelope parallel to one another and so that the corrugations of each major face are in phase with, and nest face-to-face in, the corrugations of the other major face at the ends of the envelope where the sheets are joined to each other.

Forming the mixture into corrugated sheet material may be by passing it between corrugated rollers, the edges of the sheets being joined together by pinching them together, at an elevated temperature at which the binder formulation exhibits thermoplastic softening, by means of at least one roller.

The method may include the step of locating spacing means between the sheets of corrugated sheet material during formation of the envelope therefrom. Thus, spacing means in the form of a corrugated spacer panel may be located between said sheets by having its peripheral edge sandwiched between the sheets in the peripheral join along the edge of the envelope, the method including forming the spacer panel from a particulate mixture comprising said solid electrolyte material or a precursor thereof and a binder formulation having both thermoplastic and setting properties, the constituents of the mixture being selected so that the spacer panel becomes porous during said sintering.

The method may include the step of providing an opening into the interior of the envelope by wrapping sheet material, formed from a particulate mixture of a ceramic material or precursor thereof and a binder formulation having both thermoplastic and setting properties, around a former to form a neck, joining one end of the neck to said sheets of the envelope by pressure before the curing and at a temperature at which the binder formulations in the neck and sheets are plastic, and removing the former from the neck, so that the neck, after the sintering, is bonded to the envelope and forms an opening into the envelope.

The invention extends to a laterally compressed envelope solid electrolyte material for use as an electrode holder in an electrochemical cell, whenever made in accordance with the method as described herein.

The invention extends also to an electrochemical cell comprising an envelope as described herein, the cell having an electrode held in the envelope and an electrode outside the envelope, the envelope forming a solid electrolyte whereby the electrodes are electrochemically coupled to each other.

The envelope preferably is formed entirely of sintered alumina, as described above, the electrode in the envelope being an anode of the cell and comprising sodium which is molten at the operating temperature of the cell. The other electrode may comprise a cathode or catholyte. Such catholyte may e.g. be sulphur/sodium sulphide/sodium polysulphide; or it may comprise a cathode with liquid electrolyte, e.g. as described in British Patent 2 114 803.

It is in principle possible to use the envelope as a holder for a cathode. In this case the cathode may be e.g. of the type described in the Applicant's U.S. Pat. No. 4,772,875, a particulate discharged cathode precursor mixture impregnated with electrolyte being charged into the envelope after it has been formed, and being converted into a cathode by subjecting a cell in which it is coupled as a cathode with a sodium anode to at least one charge cycle. However it is contemplated that the envelope will usually be employed as an anode holder, containing e.g. molten sodium anode material as indicted above, the cathode being outside the envelope instead of inside it.

In this case the solid electrolyte will typically be $\beta$-alumina, and in this specification $\beta$-alumina includes $\beta''$-alumina. In fact $\beta''$-alumina will usually be employed for the method by virtue of its enhanced ability, compared with $\beta$-alumina, to conduct sodium ions.

It is preferred to employ $\beta$-alumina or preferably $\beta''$-alumina in the mixture with a binder formulation of one or more binders having thermoplastic and setting properties to form the sheet material for the envelope. However, instead and as indicated above, a precursor of $\beta$- or $\beta''$-alumina may be used, being a powder mixture comprising a suitable oxide or hydroxide of aluminium, together with soda and lithia or magnesia [or precursors thereof] in suitable proportions, which mixture is known in the art to form $\beta$- or $\beta''$-alumina when sintered. By a 'precursor' of an oxide such as $\beta$-alumina, soda or lithia, is meant a substance which, when heated to 700° C. in air, becomes converted to the oxide in question.

Suitable thermoplastic and thermosetting binder formulations are known for the purpose of the present invention, and are described for example in British Patent 1 274 211. As mentioned in this British Patent a single binder may be used, provided that it displays the required thermoplastic and thermosetting properties.

Thus, polyvinyl-butyral may be used as both a thermoplastic and thermosetting binder, together with a plasticizer such as dibutyl phthalate and a solvent such as methyl ethyl ketone, the solvent and plasticizer facilitating blending of the binder into the $\beta$-alumina powder to form a homogeneous mixture. If high energy mixing, as in a Banbury mixer, is employed, the plasticizer and solvent can in principle be omitted.

Forming the mixture into sheet material may also be as described in British Patent 1 274 211, e.g. by calendering, rolling or by a doctor blade technique. The sheet material may also be densified as described in British Patent 1 274 211, e.g. by roll-compacting or pressing. As a final step in the making of the sheet material, it may be passed, as indicated above, between a pair of corrugated rollers, the rollers having suitable corrugations thereon, e.g. sinusoidal corrugations of a suitable pitch and amplitude, to provide the envelope with the desired internal capacity as will emerge hereunder; or the material may be corrugated by casting or injection moulding it in a suitable mould.

Forming the sheet material into a laterally flattened envelope may be by arranging two sheets of the material of the same size and shape [e.g. rectangular with corrugations parallel to their side edges] face-to-face with their corrugations parallel, and pinching their side edges together with sufficient force plastically to deform them into each other to form an integral join between the sheets along said side edges. Pinching said edges may be by means of roller and is optionally with the sheets at an elevated temperature in the range 50°-150° C., e.g. 60° C., at which the binder exhibits a degree of thermoplastic softening. Instead, particularly when the pinching takes place towards the lower end of said temperature range, said solvent may be applied to the edges prior to the pinching, so that a reduced pinching force can be used; and if desired such solvent can indeed be used with pinching to seal the edges together at room temperature.

When the corrugations of the major faces are fully out of phase, i.e. 180° out of phase, as described above, over a major portion of the envelope length as described above, the corrugations of at least one of the sheets will be offset laterally, so that the corrugations of the one face or sheet are fully in phase with the corrugations of the other sheet, at each end of the envelope. Thus, at each end of the envelope the corrugations of each face of sheet may be offset by 90° or a quarter wavelength or quarter pitch laterally in one direction, the corrugations of the other face or sheet being offset laterally in the opposite direction by the same amount. In this configuration the envelope will have said major portion in which the peaks of the corrugations on the sheet oppose the valleys of the corrugations of the other sheet and vice versa, so that the sheets define therebetween said plurality of more or less tubular spaces extending in parallel side-by-side relationship.

However at opposite ends of the envelope, where the corrugations of the end portions two sheets are in phase, the sheets while plastic will be deformed so that they converge together in a longitudinally outward direction so that their corrugations nest together in face-to-face relationship and the sheets can be sealed together by heat and pressure as described above, using suitably shaped complementarily corrugated presses or rollers to pinch them together at said elevated temperature, or using said solvent, or using both solvent and an elevated temperature. If desired a narrow strip of said corrugated material may be sandwiched in phase between the in-phase sheets at the ends of the envelope where they are sealed, to enhance the sealing.

The Applicant has found that, when suitably softened at an elevated temperature, it is possible mechanically to offset end portions of the sheets laterally while keeping their corrugations parallel to each other and parallel to the corrugations of said major portion of the envelope, the end portions being connected to central portions of each sheet by transition zones in which the corrugations extend at an angle to the corrugations in the central and end portions, the corrugations of the one sheet crossing over those of the other sheet in these transition zones. It is contemplated, however, that for mass production moulding or casting will be preferred for forming the sheets with offset end portions. Naturally, instead of offsetting the corrugations of each outer sheet by 90° or a quarter wavelength/pitch in opposite directions at each end of the envelope, the corrugations of one of the sheets can be offset by 180° or half a wavelength/pitch at one end of the envelope, the corrugations of the other sheet remaining straight and not offset at all at that end of the envelope. This will also in the same fashion bring the corrugations of the two sheets into phase to permit sealing together of the ends of the sheets as described above.

While it is in principle possible to seal the side edges and end edges of the corrugated sheets together as described while keeping the central portions of the sheets lightly in abutment with, or slightly spaced from, each other where the corrugations are out of phase, to permit communication and liquid flow between the tubular spaced defined therebetween, spacing means between the central portions will usually be employed as described above to ensure that they remain spaced to provide such communication.

For use of the envelope as an anode sodium holder the corrugated sheets are preferably formulated so that, after sintering, the sintered $\beta$-alumina of the sheets is as close to theoretically fully dense as possible. The $\beta$-alumina starting powder should thus preferably have an average particle size of at most 70$\mu$, more preferably 10–50$\mu$; and a maximum particle size of at most 100$\mu$, being preferably substantially monosized.

According to a particular feature of the invention the spacing means may be relatively porous and thin, so that it can be impregnated and indeed saturated with the contents of the envelope, to provide for electronic conductivity and/or optionally migration of the contents of the envelope through the spacing means.

Conveniently the spacing means is also of $\beta$-alumina. This can be made relatively porous by forming particulate $\beta$-alumina [e.g. a powder which has a relatively large particle size and is relatively monosized] into a mixture with a binder similar to that used for the outer sheets which provide said major faces of the envelope. This mixture can then be shaped into the spacing and reinforcing means in a green and plastic state, and then placed between the outer sheets in the central portion, after which it can be cured, heated to devolatilize it and sintered, together with the sheet material of said outer sheets. Provision of the required porosity can also be promoted by incorporating particles of e.g. carbon, cellulosic material or volatile organic material which can be burnt out during the subsequent devolatilizing and/or sintering steps.

A particularly convenient method in accordance with the present invention contemplates the use of corrugated-cardboard derived technology [which indeed can be used to make the sheets for the major faces of the envelope] to provide a thin corrugated panel, formed from a $\beta$-alumina mixture as described above which is formulated to be porous after sintering, at least one of which spacer panels is sandwiched between the two outer sheets, the corrugated spacer panel being of the same size and shape as the central portion and having its peripheral edge pinched between the edges of the outer sheets during the pinching step. Typically the corrugated spacer panel will be also formed by rolling between two profiled rollers, e.g. to have sinusoidal corrugations therein of a suitable small pitch, e.g. less than half that of the outer sheets, and an amplitude equal to the intended spacing between the outer sheets. The outer sheets may thus be urged against the crests of the corrugations on opposite sides of a single corrugated spacer panel during the forming of the envelope in its green state, and held in this position during the pinching. Instead, two corrugated spacer panels may be employed, each with said small corrugations of less than e.g. half the amplitude and pitch of the corrugations of the outer sheets, and the two spacer panels respectively being located in the envelope as linings for the inner surfaces of the outer sheets, being curved to nest via the crests of their corrugations against the inner surfaces of said outer sheets.

A further means of corrugating the spacer panel [or outer sheets] is to sandwich it between two sheets of a thin metal foil, e.g. aluminium foil. This sandwich may then be passed through the profiled rollers. All three layers are corrugated simultaneously. Using this method the corrugation can be carried out at room temperature. The aluminium supporting foils can be peeled off the corrugated panel when required.

If desired, the neck or feedthrough defining the opening into the envelope may be made from the mixture used for the corrugated sheets or, instead, from a mixture in which the $\beta$-alumina of the outer sheets is replaced by $\alpha$-alumina of the same particle size. During sintering after this neck is pressed or pinched to the outer sheets, the $\alpha$-alumina will form an ionically and electronically insulating neck or feedthrough integrally bonded and sintered to the envelope.

In this embodiment having the major central portion and minor end portions, when used e.g. as an anode sodium holder, all the sodium of the anode in the charged state will be housed in the tubular spaces of the central portion.

However, if desired for use as an anode sodium holder, another particular embodiment of the envelope may instead be made as indicated above with a relatively short enlarged portion defining tubular spaces located adjacent one end edge thereof. In this embodiment the outer sheets may be arranged so that a major proportion of the length of each sheet at one end of the short central portion has its corrugations in phase with the corrugations of the other sheet, nesting therein, the nesting portion of the envelope extending away from one end of the enlarged portion and the sheets being sealed together face-to-face at the opposite end of the envelope remote therefrom. In the nesting portion of the envelope between the enlarged portion and said sealed end, the nesting sheets will be spaced apart to contain sodium therebetween, a corrugated spacer panel of the type described above optionally being sandwiched between the outer sheets in this space, the spacer panel having corrugations of less than half the amplitude and wavelength/pitch of those of the outer sheets and being curved to conform with the corrugations of the outer sheets so that the crests of its corrugations on opposite sides thereof are in contact with the respective inner surfaces of the outer sheets, and so that it nests with the outer sheets.

In this case the enlarged portion may again be formed as described above by having corrugations of the one outer sheet 180° out of phase with those of the other outer sheet to form said tubular spaces between the sheets; and at opposite sides of the enlarged portion the corrugations will again be offset into phase to provide the major nesting portion and for sealing the sheets together in nesting fashion at the end of the enlarged portion opposite major nesting portion.

This embodiment is intended for use with the enlarged portion uppermost, to act as a sodium reservoir which can feed sodium downwardly under gravity into the major nesting portion of the envelope as sodium is consumed during the discharge of an electrochemical cell in which sodium is the anode material.

In this case the side edges of the outer sheets may again be closed off by pinching as described above. A green opening or feedthrough may be provided therein as described above; or a central hole may be formed longitudinally through the adjacent end of the envelope into the central portion and a separately formed sintered feedthrough can be glassed into the hole, after the envelope is sintered. Indeed, even when feedthroughs are made as described above by pressing a green tube on a former, the seal of the feedthrough to the envelope may additionally be glassed after sintering.

While the outer sheets are described above as having their corrugations offset by manipulating them when they are in a plastic state, the outer sheets may instead by made, with the offset portions preformed therein. This is expected to be the preferred method of making the sheets or panels for mass production, and, as indicated above, will typically be by casting or moulding in a suitable mould.

While curing the binder may be achieved in any desired fashion, e.g. by irradiation or the use of a catalyst, heating of a thermosetting binder such as polyvinyl butyral as mentioned above to e.g. 100°-200° C. is convenient.

The heating to devolatilize the envelope may be according to any suitable heating regime, but care should be taken that the heating is sufficiently slow to drive off the volatiles without harming the integrity of the eventual envelope in any way, and the envelope should preferably nowhere rest flat against a furnace surface during the devolatilizing.

A typical heating regime may involve heating at a rate of at most 60° C./hr from ambient up to a curing temperature of say 200° C.; slower heating of a rate of at most 30° C./hr preferably at most 10° C./hr, e.g. 6° C./hr from the curing temperature up to a temperature of say 450° C. at which all the volatiles, including carbon, have been driven off; a relatively increased rate thereafter of at most 180° C./hr up to a temperature of say 10°-20° C. below the maximum temperature; and a final heating at a slower rate of at most 60° C./hr up to the maximum temperature. After a hold of e.g. 10–20 minutes at the maximum temperature for annealing, if desired, cooling may be at a maximum rate of at most 240° C./hr down to say 1000° C.; followed by cooling at an increased rate of at most 360° C. down to ambient temperature. Preferably, after devolatilizing the envelope it is kept in a completely dry atmosphere until it is sintered, to resist cracking caused by moisture.

As the envelope is corrugated, it will rest horizontally on the floor of a furnace with only the apexes of its corrugations in contact with the floor, reducing any propensity for the underside of the envelope to blister and crack during the driving off of the volatiles, and resistance to blistering and cracking can be improved by resting the envelopes on supports which are corrugated sheets of sintered beta-alumina whose corrugations extend transversely to those of the outer sheets of the envelopes.

While the flattened envelope or holder will usually be in the form of a flat rectangular shape, it may instead be coiled, in its plastic state before curing, into a spiral whose central axis is parallel to the corrugations, one side edge being innermost and the other outermost. In this configuration it can rest in a furnace on one of its end edges to resist cracking and blistering caused during devolatilization when a flat surface of an envelope rests face down on a furnace floor. A spirally arranged electrode can then be placed face-to-face with, on one or both sides of, the curved spiral envelope, which will contain the opposite electrode.

The invention will now be described, by way of example with reference to the accompanying diagrammatic drawings in which.

Referring first to FIGS. 1 to 5, reference numeral 10 generally designates a laterally flattened envelope of $\beta''$-alumina in accordance with the invention. The envelope is rectangular in outline and has a tubular anode feedthrough 12 at one end thereof, leading into its hollow interior through one end edge thereof. The envelope 10 has two outer sheets in the form of panels 14, 16 of sintered full density $\beta''$-alumina which are spaced apart in a central portion 18 [FIG. 1] to define a hollow interior for the envelope. The sheets or panels 14, 16 in the central portion 18 are spaced apart by a sintered corrugated porous $\beta$-alumina spacer panel 20 located between the panels 14, 16.

Figure 1:
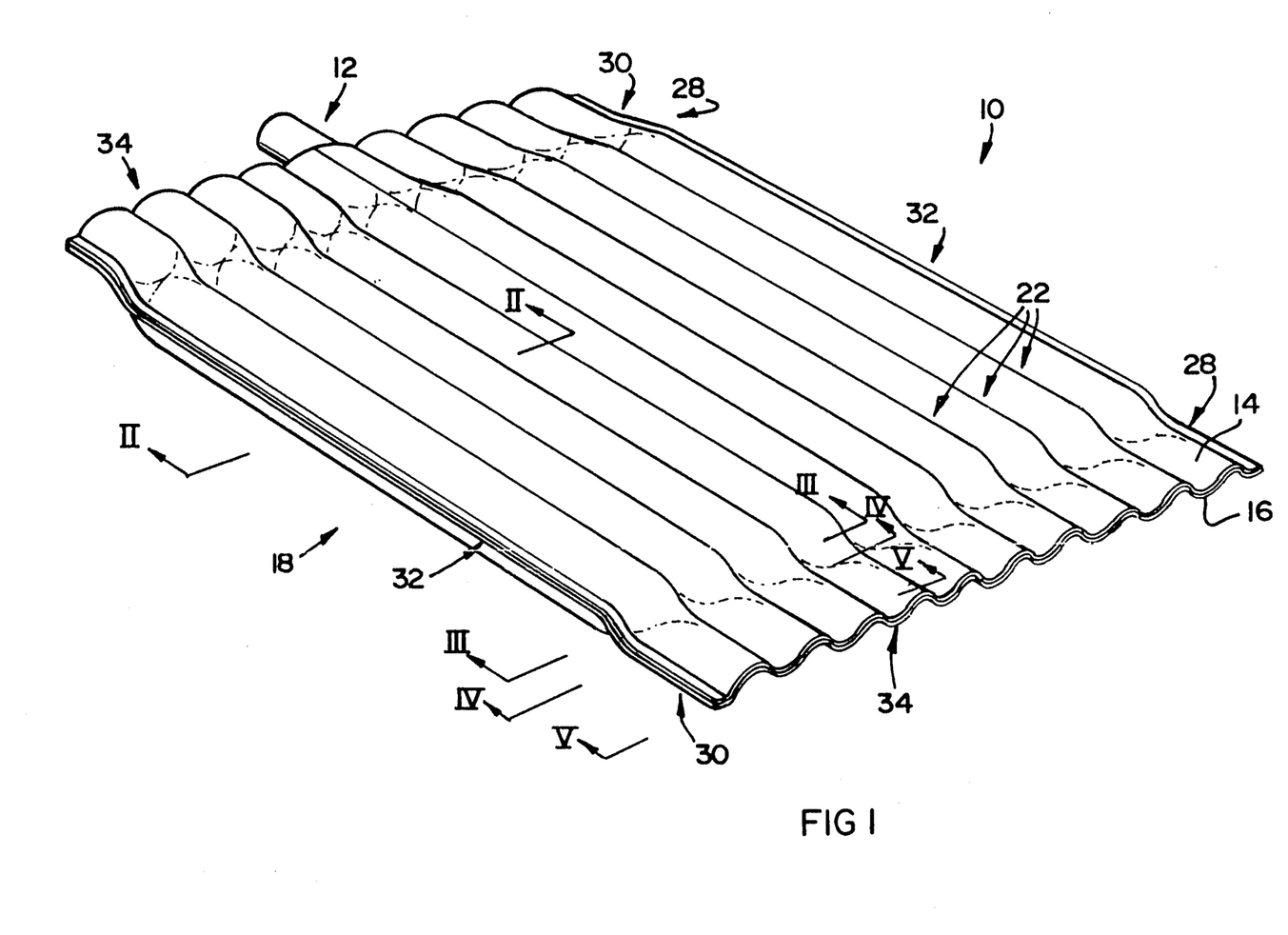
FIG. 1 shows a three-dimensional view of one embodiment of a $\beta$-alumina anode envelope in accordance with the method of the present invention.
Figure 2:
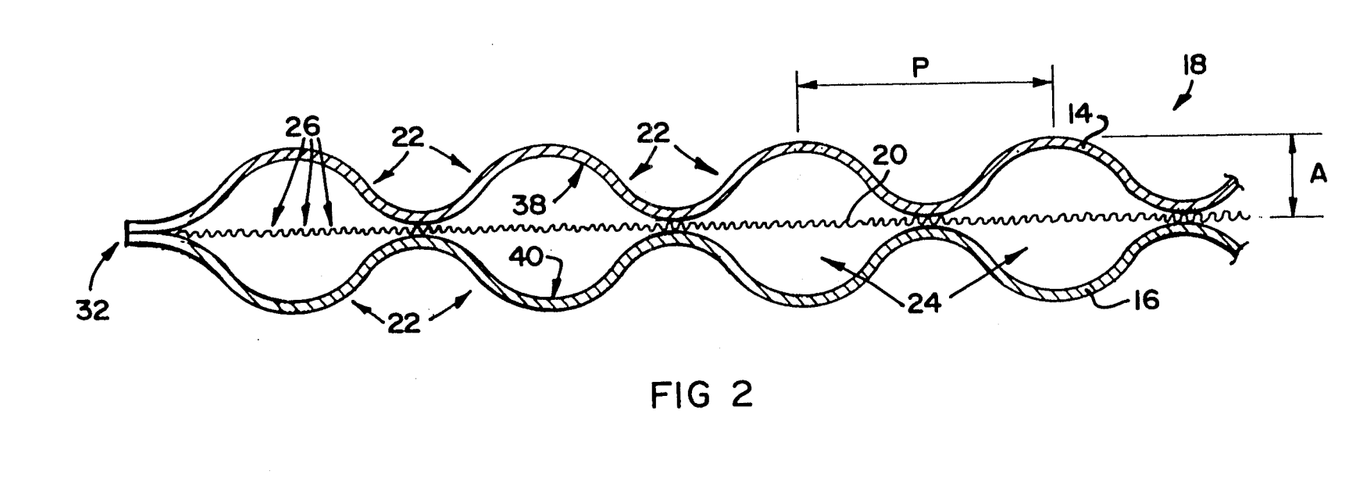
FIGS. 2 to 5 show cross-sections of the envelope of FIG. 1, in the directions respectively of lines II—II to V—V in FIG. 1.

The sheets or panels 14 and 16 are longitudinally corrugated, in sinusoidal fashion, and in the central portion 18 of the envelope [see FIG. 2] the corrugations 22 of the sheets or panels 14, 16 are parallel to one another, the corrugations 22 of the panel 14 being 180° out of phase, i.e. fully out of phase with the corrugations 22 of the panel 16. The peaks of the corrugations of the panel 14 are thus in register with and opposed to the valleys of the corrugations of the panels 16, and vice, versa, so that the panels define a series of side-by-side more or less tubular spaces 24 therebetween. Typically, the amplitude A and pitch P of the corrugations 22 of the panels 14, 16 are respectively about 10 mm and about 7 mm, and the thickness of said panels is typically about 0.9–1 mm, so that it will be appreciated in this regard that the drawings are somewhat schematic and not entirely to scale.

The spacer panel 20 has corrugations 26 which are substantially smaller than the corrugations 22 of the panels 14, 16, having a pitch P and amplitude A respectively substantially less than half those of the panels 14, 16. The panel 20 is sandwiched between the panels 14, 16, dividing each of said tubular spaces 24 in half, but does not isolate the halves of said spaces 24 from each other, as the panel 20, as mentioned above, is porous to molten sodium.

The feedthrough 12 is provided centrally through one of the end edges of the envelope 10, extending in a direction parallel to the corrugations 22, 26 of the panels 14, 16 and 18.

At opposite ends of the central portion of the envelope 10, the corrugations 22 of the panel 14 are offset laterally to one side, and the corrugations 22 of the panel 16 are offset laterally in the opposite direction, in transition zones 28 [FIG. 1] where the corrugations 22 depart from the parallel direction of the central portion 18 so that the corrugations 22 of the panel 14 cross over the corrugations 22 of the panel 16. On the side of each transition zone 28 remote from the central portion, the envelope has end portions 30 wherein said corrugations 22 once again extend parallel to the direction in which they extend in the central portion.

Figure 3:
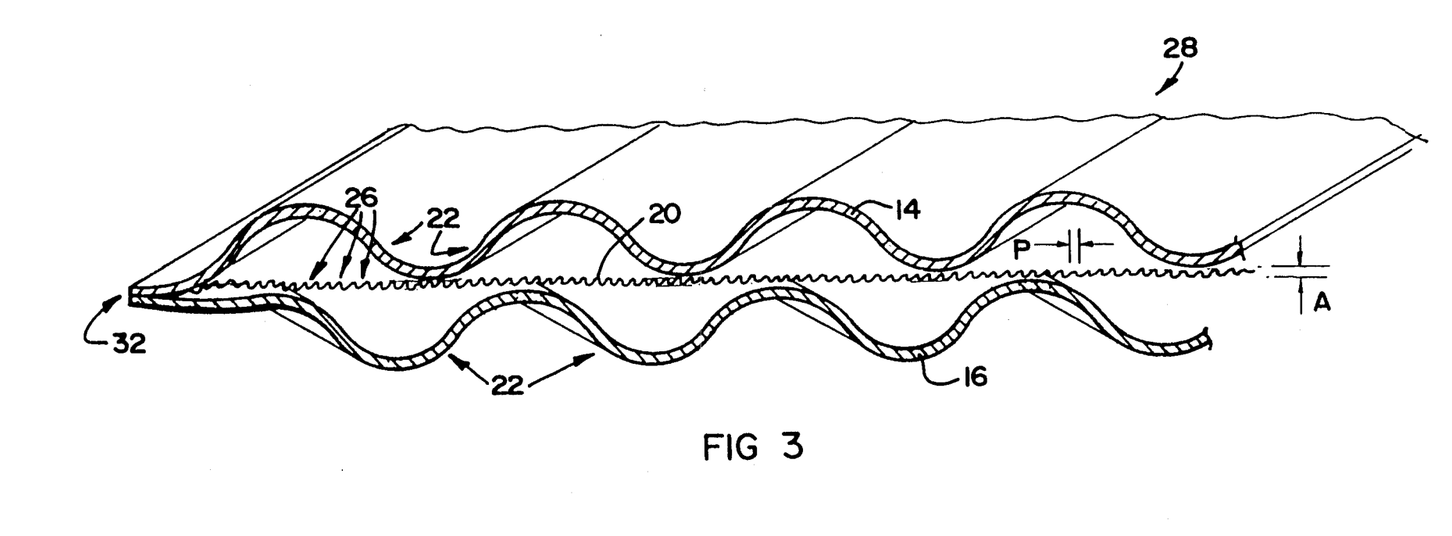
Figure 4:
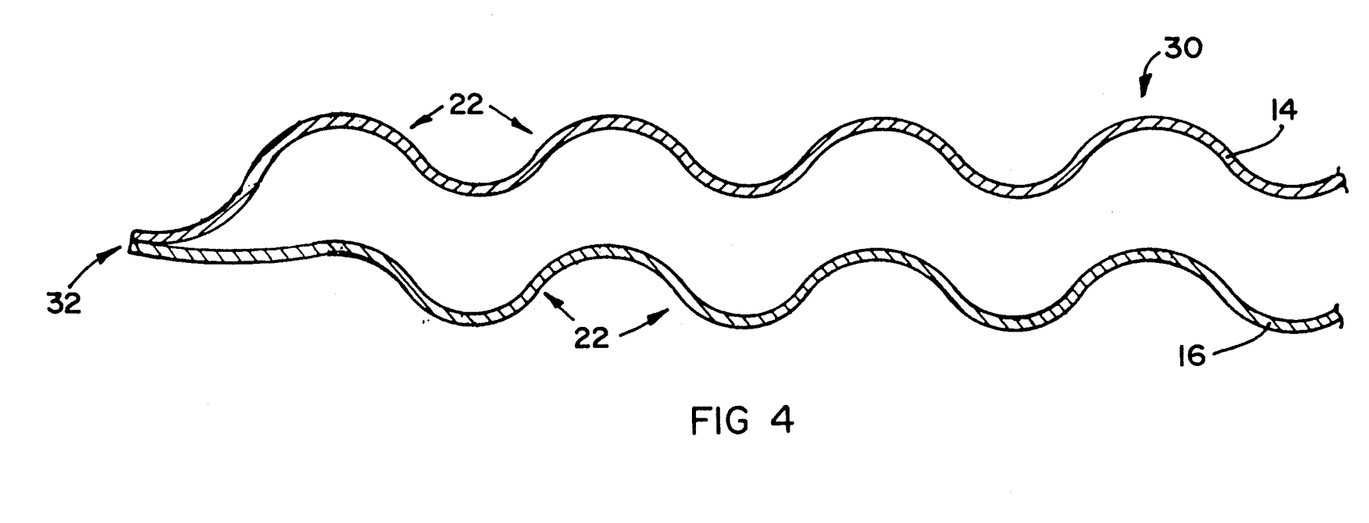
Figure 5:
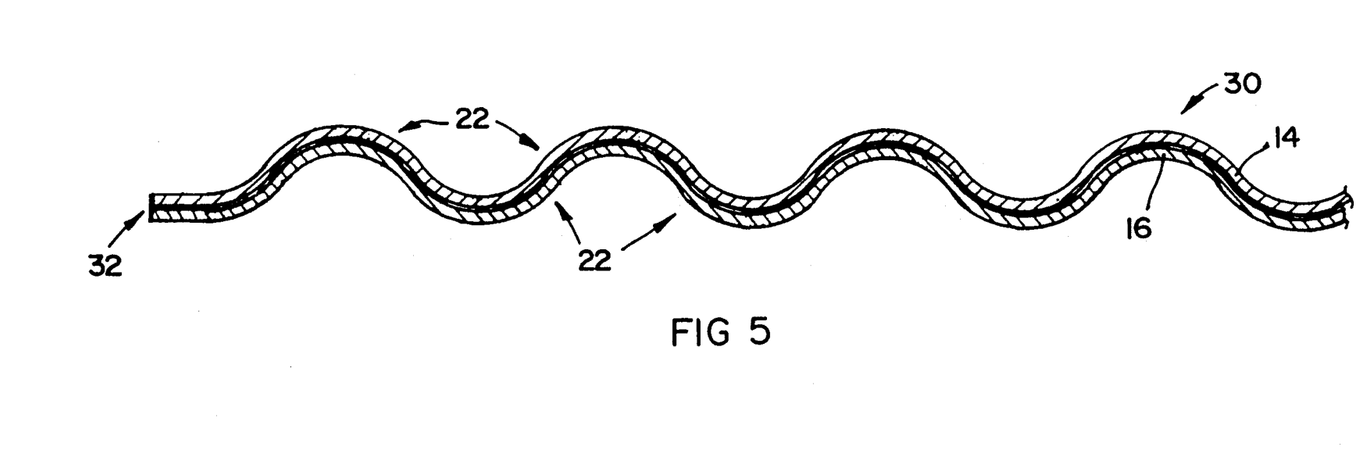

A cross-section through one of the transition zones 28 is shown in FIG. 3; a cross-section through the envelope through one of the end portions 30 of the envelope adjacent said transition zone 28 on its side opposite the central portion 18 is shown in FIG. 4; and a cross-section through said end portion 30 adjacent its end edge remote from the transition zone 28 is shown in FIG. 5.

As will be seen from FIGS. 4 and 5, the offsetting laterally of the corrugations 22 in the panels 14 and 16 is respectively by 90° or a quarter wavelength/pitch of the corrugations in each direction, so that in the end portions 30 as shown in FIGS. 4 and 5 the corrugations 22 of the panel 14 are completely in phase with the corrugations 22 of the panel 16. In the transition zones 28 the panels 14, 16 are spaced from each other by the same spacing as they are spaced from each other in the central portion 18, and the spacer panel 20 extends across the width of the interior of the envelope between its side edges 32 in the central portion and transition zones 28. However, the spacer panel 18 does not extend longitudinally outwardly in opposite directions beyond the transition zones 28.

Longitudinally outwardly of the transition zones, the panels 14, 16 converge towards each other until they are face-to-face in abutment at the end edges 34 of the envelope as shown in FIG. 5, where they are sealed together. The panels 14, 16 are also sealed together at the side edges 32, as described hereunder.

Naturally, and in some cases preferably, the spacer panel 22 shown in FIGS. 2 and 3 may be replaced by a narrow strip of similarly finely corrugated material located between the panels 14, 16 at the end of the central portion remote from the feedthrough 12, the corrugations of this narrow strip extending lengthwise along the narrow strip, and the narrow strip and its corrugations extending at right angles to the lengths of the corrugations 22 and spaces 24.

Figure 6:
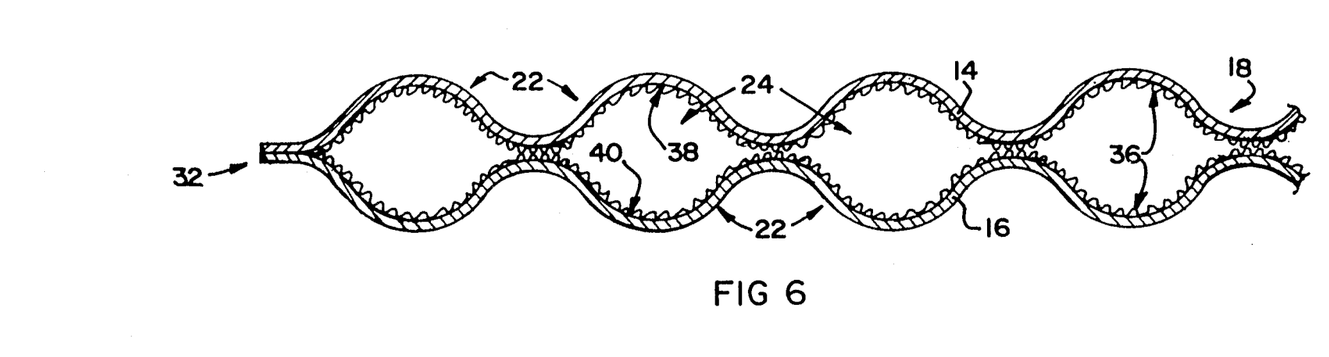
FIG. 6 shows a cross-section corresponding to FIG. 2 of another construction for the envelope of FIG. 1.

In FIG. 6, which corresponds to FIG. 2, a different construction is shown for the envelope 10, in which it has two spacer panels 36 instead of the single spacer panel 20 shown in FIG. 2. These spacer panels 36 are similarly corrugated with small corrugations parallel to the corrugations 22 of the panels 14, 16, but instead of being located in flat planar fashion between the panels 14, 16, bisecting the tubular spaces 24, as in the case of the spacer panel 20, the spacer panels 36 are respectively curved so that they nest in and are in abutment with the inner surfaces of the panels 14, 16. The tubular spaces 24 are thus defined between the spacer panels 36, which spacer panels 36 are respectively, at the crests of the peaks/valleys of their corrugations, in contact with the inner surfaces 38, 40 of the panels 14, 16.

Figure 7:
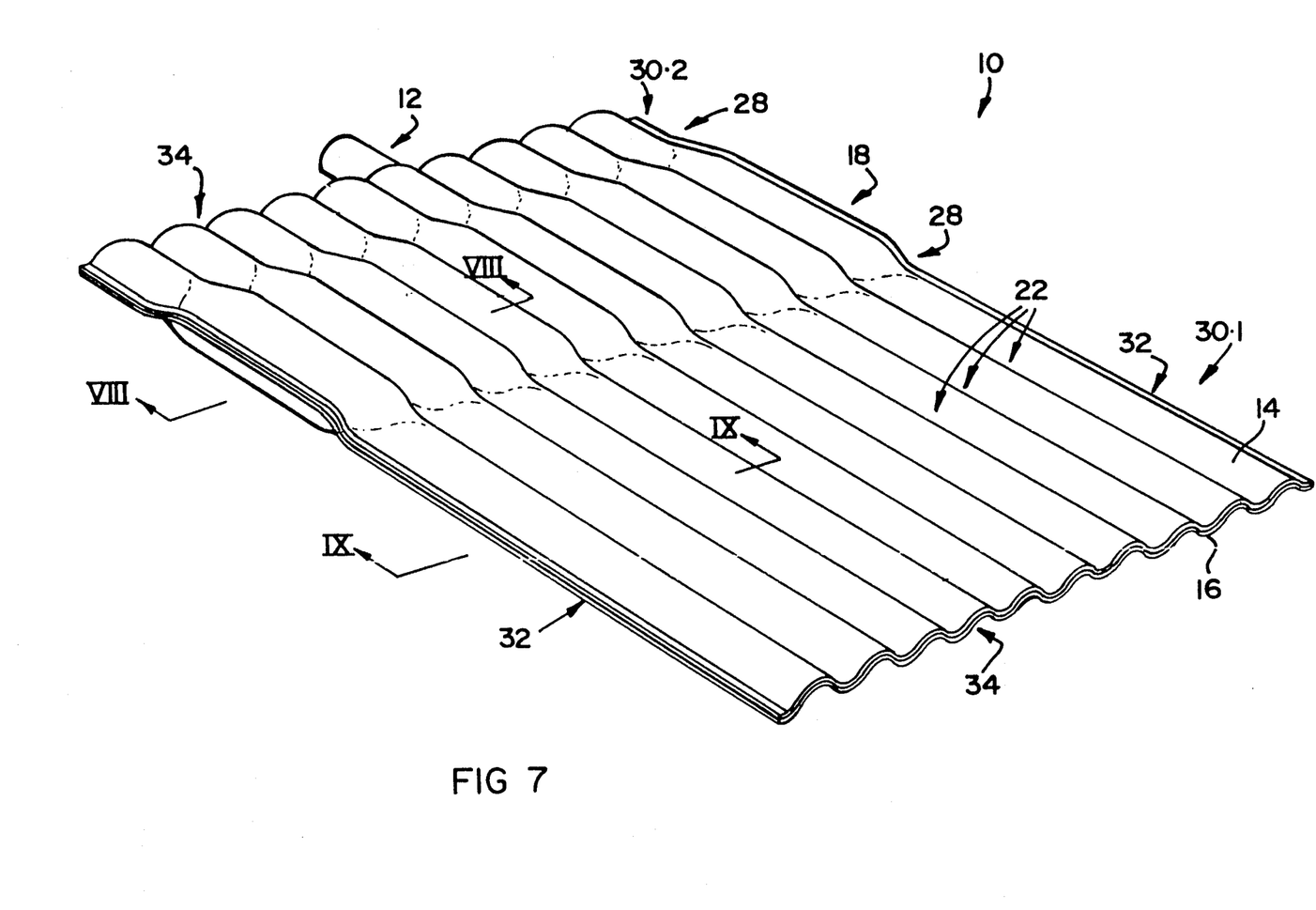
FIG. 7 shows a three dimensional view of another embodiment of a $\beta$-alumina envelope in accordance with the method of the present invention.
Figure 8:
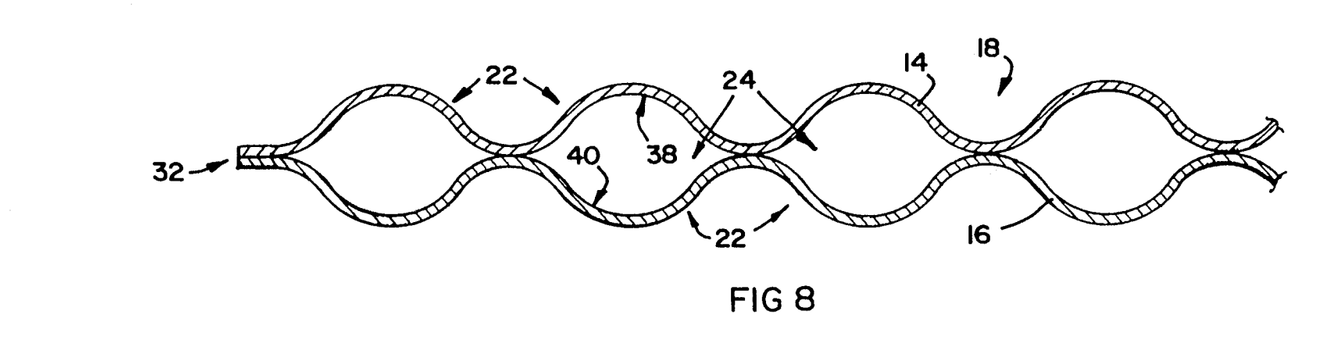
FIGS. 8 and 9 show cross-sections of the envelope of FIG. 7, in the directions respectively of lines VIII—VIII and IX—IX in FIG. 7.
Figure 9:
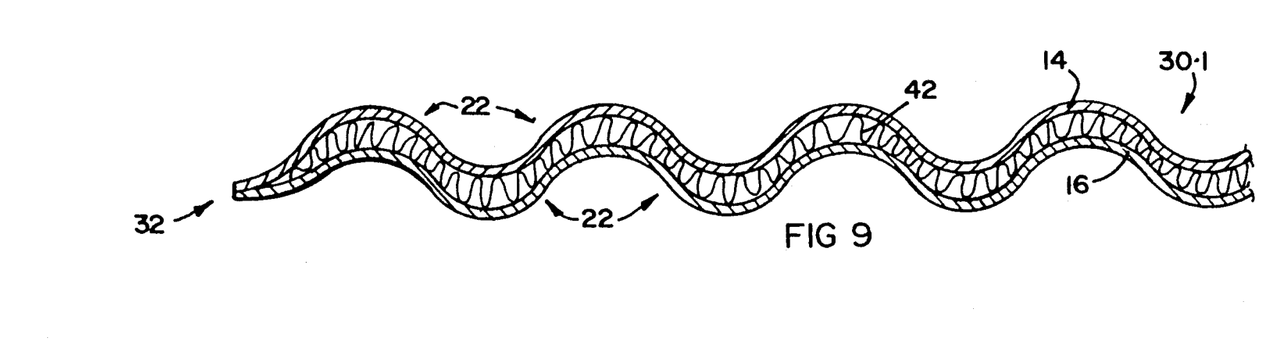

Turning to FIGS. 7 to 9, the same reference numerals refer to the same parts as in FIGS. 1 to 6 unless otherwise specified.

However, in FIGS. 7 to 9, the central portion 18 has no spacer panels 20 or 36. Furthermore, one of the end portions, designated 30.1, is longer than the central portion 18 and extends over the major portion of the length of the envelope 10, the other end portion, designated 30.2, being as in FIGS. 1-6.

In the end portions 30.1, 30.2 of the envelope the panels 14 and 16 have their corrugations 22 nesting face to face with each other, and in the end portion 30.1 a spacer panel 42, similar to the spacer panels 36 of FIG. 1, is sandwiched between the in-phase corrugations and nests therebetween [FIG. 9], in contact with the inner faces 38 and 40 of the panels 14, 16.

At the end of the portion 30.1 remote from the central portion and close to the adjacent end edge 34, the panels 14, 16 converge towards each other and into abutment with each other at said end edge 34, where they are sealed together [as in FIG. 5].

Figures 10, 11, 12:
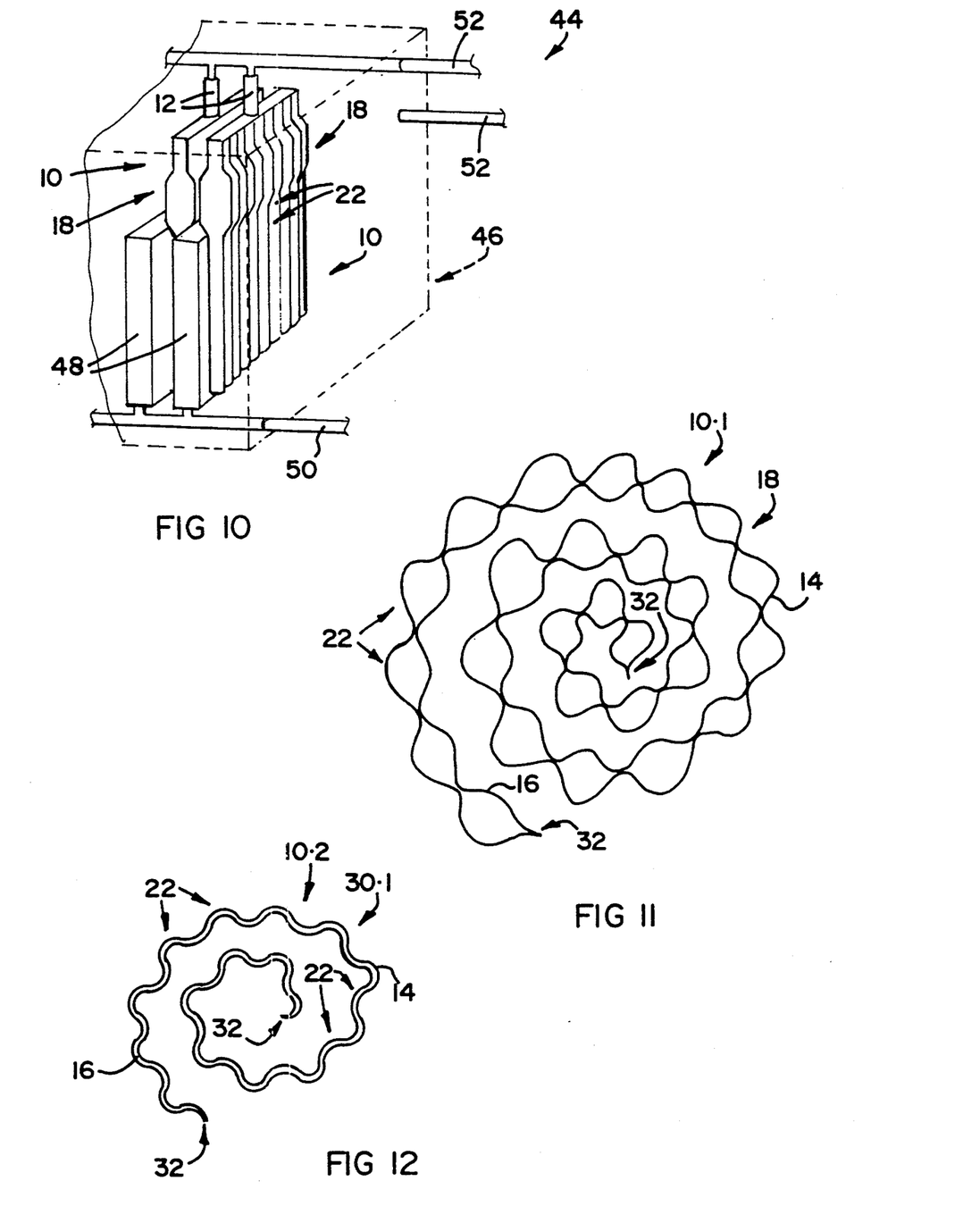
FIG. 10 shows a schematic three dimensional view of an electrochemical cell incorporating a plurality of envelopes according to FIG. 7.
FIGS. 11 and 12 shows schematic sectional plan views of coiled versions of the envelopes of FIGS. 1 and 7.

Turning to FIG. 10, reference numeral 44 generally designates a high temperature rechargeable electrochemical cell in accordance with the present invention. The cell is shown having a box-like housing 46 made of flat α-alumina panels within which a plurality of flat cathode structures 48 are arranged in spaced parallel, face-to-face relationship. These cathodes are of the type described in British Patent 2 114 803 and are impregnated with and immersed in a molten salt liquid electrolyte [not shown] also of the type described in British Patent 2 114 803. These cathode structures 48 are connected in parallel to a common cathode cell terminal 50.

The cell 44 further comprises a plurality of anode structures, each in the form of an envelope 10 according to the present invention and containing molten sodium active anode material.

The envelopes are, in FIG. 10, of the type shown in FIGS. 7-9, their central portions 18 being uppermost and filled with sodium to act as sodium reservoirs for feeding sodium downwardly under gravity, as it is consumed during discharge of the cell, into the narrow lower end portions 32 of the holders 10 which are arranged in a row, alternating between the cathode structures 48, face-to-face therewith and closely spaced therefrom. The level of electrolyte in the housing 46 is such that the cathode structures 48 are at all times immersed therein. The feedthroughs 12 of the envelopes 10 are all in communication with a common passage or manifold 52 which leads to an external vapour trap [not shown] and then into the freeboard of the housing 46, above the level of the electrolyte. The passage 52 is of steel and has steel branch pipes leading down via the feedthroughs 12 [to which feedthroughs said branch pipes are sealed] into the sodium in the central portions 18, so that the passage 52 acts as a common anode terminal which connects the anode structures electrically in parallel.

In FIG. 10 the function of the passage 52 with its vapour trap is pressure equalization between the interiors of the envelopes 10 on the one hand and the interior of the housing 46, outside the envelopes 10, on the other hand. This pressure equalization is desirable to compensate for the fact that, with charging and discharging, sodium moves respectively into and out of the envelopes 10 through their outer panels 14, 16 from and to the electrolyte. Without this pressure equalization a drop in pressure in the envelopes and an increase in pressure in the electrolyte, during discharging of the cell, can in particular stress the envelopes and damage them. It is for this reason, too, that the corrugated panels 20, 36, 42 [see FIGS. 2, 6 and 9] are desirable, as they reinforce the envelopes against external pressure. They also retard free flow of sodium therein, in the event of cracking or fracture of the envelopes, which promotes safety.

It should be noted that in FIG. 10 the housing 46 is shown in broken lines, with the rest of the cell in the interior of the housing in solid lines.

In FIGS. 11 and 12, numerals 10.1 and 10.2 respectively designate spirally coiled holders according to the invention, coiled while they are plastic, for firing while resting on a furnace floor via one of their side edges 32 to reduce blistering and cracking. These can be used with a spirally arranged electrode arranged face-to-face therewith, opposite electrodes being in the interior of the holder. The section in FIG. 11 is through the central portion 18 [see FIG. 2] but for ease of illustration the spacer panel 20 [see FIG. 2] is omitted for ease of illustration. The section in FIG. 12 is through the end portion 30.1 [see FIG. 9] again with the spacer panel 42 [see FIG. 9] omitted. Otherwise the same reference numerals refer to the same parts as in FIGS. 1 to 10.

Figure 13:
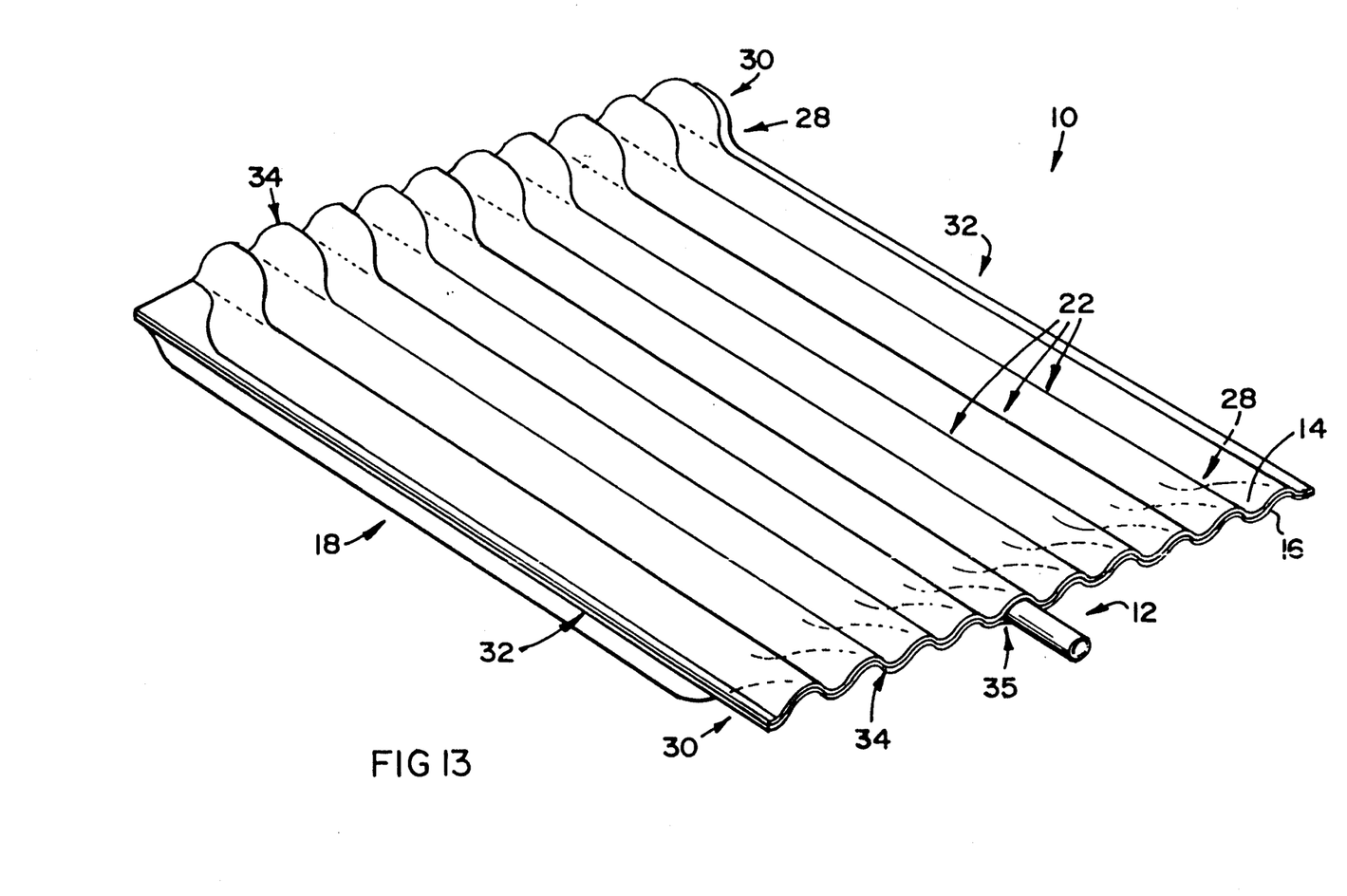
FIG. 13 shows a view similar to FIGS. 1 and 7 of another embodiment of a $\beta$-alumina envelope according to the invention.
Figure 14:
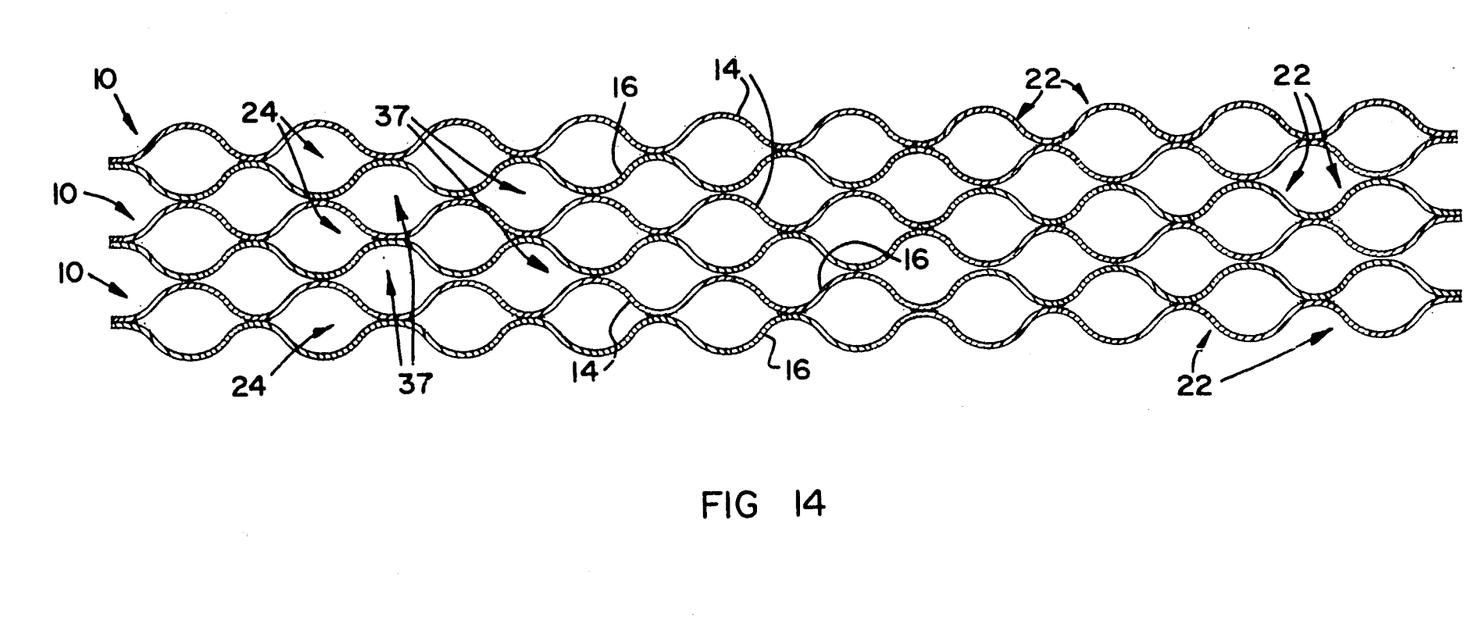
FIG. 14 shows a portion, in schematic cross-section, of a stack of envelopes according to FIG. 13 in a cell.

In FIGS. 13 and 14 the same reference numerals are again used as in FIGS. 1 to 12, unless otherwise specified.

The envelope 10 of FIG. 13 is substantially similar to that of FIG. 1 and it has a spacer panel [not shown] similar to that designated 20 in FIG. 2. The main difference between the envelope 10 of FIG. 13 and that of FIG. 1 is that the offsetting laterally of the corrugations 22 at each end of the panel occurs in only one of the panels 14, 16, the corrugations of the other panel 14, 16 at that end of the envelope being straight and not offset at all. This offsetting is thus by 180° or a half wavelength/pitch, and not the 90° or quarter wavelength/pitch of FIG. 1, but it achieves the same effect of allowing the corrugations of the panels 14, 16 to be fully in phase and capable of nesting in each other at each end of the envelope as shown. It follows that in the transition zones 28 the corrugations 22 of one of the panels 14, 16 are straight where they are crossed over by the offset corrugations of the other panel 14, 16. Each of the panels 14, 16 has its corrugations offset at one end thereof, so that said panels 14, 16 are of the same shape, although one panel can be used with its corrugations offset at both ends thereof with the corrugations of the other panel offset at neither end thereof, being straight along their full lengths.

As in FIG. 1, where the feedthrough 12 enters the envelope 10, the valley between a pair of corrugations is deformed away from the opposing panel to provide an aperture between the panels at 35 into which the feedthrough passes into the associated tubular space [see 24 in FIG. 2].

In FIG. 14 three envelopes are shown stacked on each other with their corrugations 22 in register. When stacked in this fashion, tubular spaces 37 [similar in shape to the tubular spaces 24 inside the envelopes] are defined between the envelopes. When the envelopes 10 contain e.g. sodium in their interiors, cathode structures [not shown] having the same function as the cathode structures 48 of FIG. 10 but cylindrical in shape, can be provided in the tubular spaces 37. These cathode structures can similarly be immersed in electrolyte and provided with current collectors whereby they are connected in parallel, the sodium anode material in the interiors of the envelopes suitably being connected in parallel via their feedthroughs 12 Indeed, if desired, the envelopes 10 can be immersed in a catholyte such as sodium sulphide/polysulphide.

An advantage of the structure shown in FIG. 14 is that a stack of a multiplicity of envelopes 10 can be built up [only three being shown in FIG. 14 for ease of illustration] in a suitable housing [see 46 in FIG. 10], and the stack will be of considerable strength, because of the honeycomb-like reinforcing effect of the corrugations 22 of the various envelopes 10.

EXAMPLE

By way of example, the Applicant proposes for use in the envelopes 10, a mixture for the sheets for making the outer panels 14, of the following composition:

| Constituent | |
| --- | --- |
| $\beta''$-alumina powder [10–50μ size] | 80–120 g |
| binder | 14–18 g |
| plasticizer | 5–10 g |
| solvent | 0–50 ml |

The binder, plasticizer and solvent will be of the type described in British Patent 1 274 211.

When mixed the constituents will form a semi-dry powder mixture. This will be fed through a hot rolling machine with multiple rollers at about 50°–150° C. (depending on the composition employed) at which temperature the binder will be plastic. The mixture will, be rolled to a flat sheet of a thickness of about 0.6 mm and having a density after rolling, of about 2.1 –2.3 g/cm$^3$, and will then be rolled by a sinusoidally profiled roller to make sheet material for the outer panels or sheets 14, 16 which can then be cut to size.

A further sheet made in similar fashion will be passed at 50°–70° C. between two corrugated rolls to impart corrugations thereto having a pitch e.g. of about 5 mm and an amplitude of about 2 mm for the spacer panels 20, 36, 42 and cut to size. These corrugated spacer panels will then be sandwiched where required between the panels 14, 16 to form the spacer panels 20, 36, 42 and can be formed while hot and plastic, if necessary, to conform with the corrugations 22 of the panels 14, 16 [FIGS. 6 and 9]. The corrugations 22 of the panels 14, 16 will be out of phase to form the tubular spaces 24. The edges 32 of the envelope 10 can be sealed at 50°–70° C. using a small roller and hand pressure; and the feedthrough can be pinched and sealed at 50°–70° C. between the ends of the sheets 14, 16 before the former is removed. The end edges 34 will be sealed with a sinusoidally profiled roller after the end portions 30, 30.1, 30.2 have been offset, while the panels 14, 16 are plastic, so that the corrugations of the panels 14, 16 are out of phase only in the central portion 18, but are in phase and nesting in said end portions.

A free-standing green envelope will be obtained which will then be heated and fired according to the following regime:

ambient—450° C. at 10° C./hr
450°–1600° C. at 180° C./hr
1600°–1617° C. at 60° C./hr
1617° C.—hold for 15 minutes
1617°–1000° C. at 240° C./hr
1000° C.—ambient at 360° C./hr After use of this firing regime a continuous unitary sintered $\beta''$-alumina envelope will be obtained. It is expected to comprise about 98% by mass $\beta''$-alumina having a density of 3.1–3.2 g/cm$^3$. The envelope is expected to exhibit a [linear] shrinkage of about 17–18% upon firing.

This Example demonstrates the feasibility of the method of the present invention for making $\beta''$-alumina envelopes of the type in question, of acceptable quality and density.

We claim:

1. A laterally compressed envelope of solid electrolyte material for use as an electrode holder in an electrochemical cell, the envelope having a pair of opposed corrugated major faces provided by a pair of sheets of the solid electrolyte material joined to each other along their edges to provide a peripheral edge for the envelope, the major faces being aligned with each other so that their corrugations extend lengthwise along the envelope parallel to one another and so that at least one space is defined between the faces for holding electrode material, the corrugations in each major face nesting face-to-face in the corrugations of the other major face at the ends of the envelope where the sheets are joined to each other.

2. An envelope as claimed in claim 1, in which the major faces are aligned so that the corrugations of each major face are, over at least a portion of the length of the envelope, at least partially out of phase with the corrugations of the other major face in a direction normal to the length of the corrugations.

3. An envelope as claimed in claim 2, in which the corrugations of each major face are, over a major portion of the length of the envelope, 180° out of phase with the corrugations of the other major face, so that the sheets define therebetween, over said major portion of the length of the envelope, a plurality of tubular spaces extending in parallel side-by-side relationship.

4. An envelope as claimed in claim 2, in which the corrugations of each major face are, over a minor portion of the length of the envelope, 180° out of phase with the corrugations of the other major face to define between the sheets a plurality of tubular spaces in side-by-side parallel relationship, the tubular spaces being located at or adjacent one end of the envelope and the corrugations of each major face, between said tubular spaces and the join between the sheets at the opposite end of envelope, being in phase with and nesting in the corrugations of the other major face over a major portion of the length of the envelope, the sheets being spaced apart from each other along said major portion of the length of the envelope.

5. An envelope as claimed in claim 1, in which the corrugations of each major face are, over their full lengths between the joins between the sheets at the ends of the envelope, in phase with and nesting in the corrugations of the other major face, the sheets being spaced apart from each other along said nesting parts of the corrugations.

6. An envelope as claimed in claim 1, which has an opening into its interior to permit flow of material therethrough during use of the envelope as an electrode holder.

7. An envelope as claimed in claim 1, in which spacing means is located between the sheets in the interior of the envelope to space the sheets apart and to promote communication and liquid flow between all parts of the interior of the envelope.

8. An envelope as claimed in claim 7, in which the spacing means is in the form of a corrugated porous spacer sheet located between the major faces of the envelope, the spacer sheet having corrugations which are smaller in pitch and amplitude than the corrugations of the major faces.

9. An envelope as claimed in claim 1, which is formed entirely of sintered alumina, at least the sheets providing the major faces of the envelope being of $\beta$-alumina.

10. A method of making a laterally compressed envelope of solid electrolyte material for use as an electrode holder in an electrochemical cell, the method comprising the steps of:

forming a mixture comprising said solid electrolyte material or a precursor thereof in particulate form together with a binder formulation which has both thermoplastic and setting properties;

forming the mixture into corrugated sheet material;

forming two corrugated sheets of the sheet material into a laterally compressed envelope having a pair of opposed corrugated major faces formed from said sheet material, the sheets being joined to each other along a peripheral edge of the envelope and being arranged so that at least one space is defined between the sheets for holding electrode material;

treating the envelope to cure the binder formulation;

heating the envelope after the curing to volatilize the binder formulation; and sintering the envelope after the volatilization to convert the envelope into a sintered refractory solid electrolyte artifact, the major faces of the envelope being aligned with each other during the forming of the envelope from the corrugated sheets so that their corrugations extend lengthwise along the envelope parallel to one another and so that the corrugations of each major face are in phase with, and nest face-to-face in, the corrugations of the other major face at the ends of the envelope where the sheets are joined to each other.

11. A method as claimed in claim 10, in which forming the mixture into corrugated sheet material is by passing it between corrugated rollers, the edges of the sheets being joined together by pinching them together, at an elevated temperature at which the binder formulation exhibits thermoplastic softening, by means of at least one roller.

12. A method as claimed in claim 11, which includes the step of locating spacing means between the sheets of corrugated sheet material during formation of the envelope therefrom.

13. A method as claimed in claim 12, in which spacing means in the form of a corrugated spacer panel is located between said sheets by having its peripheral edge sandwiched between the sheets in the peripheral join along the edge of the envelope, the method including forming the spacer panel from a particulate mixture comprising said solid electrolyte material or a precursor thereof and a binder formulation having both thermoplastic and setting properties, the constituents of the mixture being selected so that the spacer panel becomes porous during said sintering.

14. A method as claimed in claim 10, which includes the step of providing an opening into the interior of the envelope by wrapping sheet material, formed from a particulate mixture of a ceramic material or precursor thereof and a binder formulation having both thermoplastic and setting properties, around a former to form a neck, joining one end of the neck to said sheets of the envelope by pressure before the curing and at a temperature at which the binder formulations in the neck and sheets are plastic, and removing the former from the neck, so that the neck, after the sintering, is sintered to the envelope and forms an opening into the envelope.

15. A laterally compressed envelope solid electrolyte material for use as an electrode holder in an electrochemical cell, whenever made in accordance with the method as claimed in claim 10.

16. An electrochemical cell comprising an envelope as claimed in claim 1, the cell having an electrode held in the envelope and an electrode outside the envelope, the envelope forming a solid electrolyte whereby the electrodes are electrochemically coupled to each other.

17. A cell as claimed in claim 16, in which the envelope is formed entirely of sintered alumina, at least the sheets providing the major faces of the envelope being of $\beta$-alumina, and the electrode in the envelope being an anode of the cell and comprising sodium which is molten at the operating temperature of the cell.

* * * * *